July 13, 1965  A. T. CAPE  3,194,501
POWDER MELTING TORCH
Filed Aug. 13, 1963
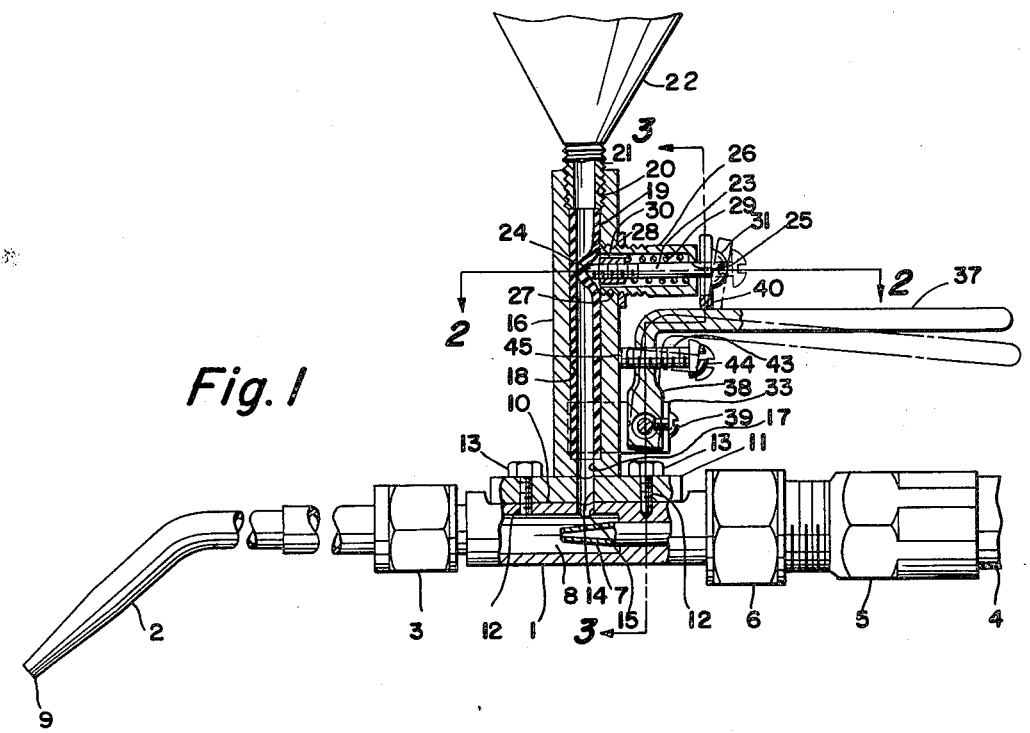
Fig. 1
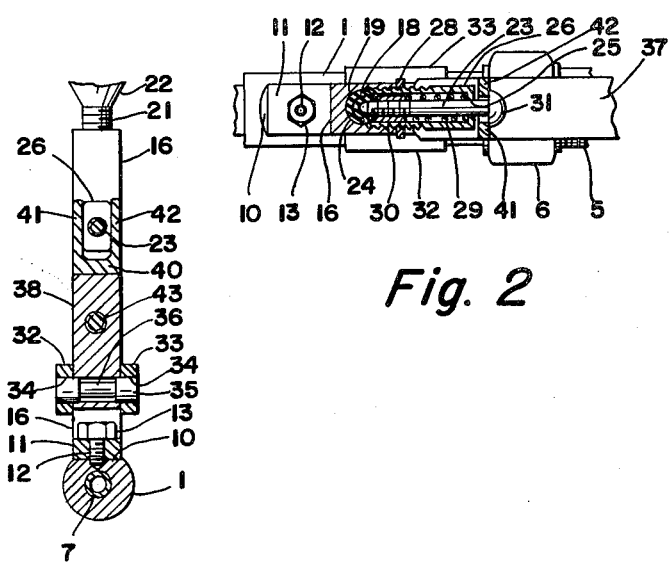
Fig. 2
Fig. 3
INVENTOR.
ARTHUR T. CAPE
BY Isler & Ornstein
ATTORNEYS

United States Patent Office 3,194,501
Patented July 13, 1965

3,194,501
POWDER MELTING TORCH
Arthur T. Cape, Monterey, Calif., assignor to Powder Melting Corporation, Monterey, Calif., a corporation of California
Filed Aug. 13, 1963, Ser. No. 301,822
2 Claims. (Cl. 239—85)

This invention relates generally to powder melting torches, but has reference more particularly to improvements in the torch disclosed in Lamb Patent 2,957,630.

The aforesaid Lamb patent discloses a torch with an internal powder feed, and in which a handle provided with a finger is used to pinch or close a resilient tube for the purpose of cutting off the flow of powder. Means are also provided for preventing the handle from fully closing the resilient tube, so that a controlled amount of powder can flow through the tube, without the necessity of manually holding the handle in open position. Such means is adjustable, so that a varied amount of powder can be made to flow through the tube, as required for long or continued coating operations.

I have found in attempting to manipulate such a torch, that the adjustment for varying the amount of powder flow is difficult to manipulate, and that the position of the adjustment means above the handle requires the use of additional parts, including a wing nut. Moreover, the use of a handle having a pivotal movement to close the tube requires the use of an exposed spring, which can easily become dislodged from its position, in addition to which, the handle itself can be easily dislodged from its position on the torch. The position of the adjustment means above the handle is also objectionable, in that it acts as an obstruction to proper manipulation of the handle.

The present invention has as its primary object, the provision of a powder melting torch of the character described, which overcomes all of the aforesaid disadvantages.

In particular, my torch is characterized by the use of an adjustment for varying the amount of powder flow, which is very conveniently located with respect to the torch, and which eliminates the use of the aforesaid wing nut, as well as the use of a threaded stud which is welded or brazed to the torch body.

My torch is further characterized by the fact that there are no obstructions to proper manipulation of the handle, by the fact that the handle cannot be dislodged from its position on the torch, and by the fact that the spring for closing the tube is not exposed and cannot be dislodged from its position on the torch.

Other objects and advantages of my invention will be apparent during the course of the following description.

In the accompanying drawings forming a part of this specification, and in which like numerals are employed to designate like parts throughout the same, FIG. 1 is a view, partly in elevation, and partly in section, showing a torch embodying the novel features of the invention;

FIG. 2 is a fragmentary cross-sectional view, taken on the line 2—2 of FIG. 1, and FIG. 3 is a fragmentary cross-sectional view, taken on the line 3—3 of FIG. 1.

Referring more particularly to the drawings, there is disclosed a torch having a body 1, to the forward end of which a nozzle 2 is secured, as by a coupling nut 3. A torch butt, fragmentarily indicated by reference numeral 4 in FIG. 1, is secured to the torch body 1 by an adapter or coupling 5 and a nut 6. The butt 1 is provided, adjacent its rear end, with knobs (not shown) which operate oxygen and fuel gas valves, for controlling the flow of such oxygen and fuel gas through the torch in accordance with conventional torch design.

The combustible mixture of oxygen fuel gas is carried into the torch body by means of a nozzle 7, which discharges the combustible mixture into a chamber 8 in the body 1, the mixture flowing from this chamber into the nozzle 2, to provide a powder melting flame at the tip 9 of the nozzle.

The body 1 is provided with a flat surface 10, to which a base plate 11 is secured, as by studs 12 and nuts 13.

The base plate 11 is provided with a vertical opening 14, which communicates, at its lower end, with an opening 15 through which powder is dropped into the chamber 8 of the torch body.

The base plate 11 has brazed to its upper surface a tube 16, of rectangular external transverse cross-section. The tube 16 is provided at its lower end with a bore 17 which is in axial alignment with the openings 14 and 15, and is counterbored, as at 18, for the reception of a resilient tube 19, preferably made of rubber, the rubber being of a grade or type capable of withstanding heat without deterioration, for example, silicone rubber.

The tube 19 has an internal diameter substantially the same as the diameter of the bore 17 and openings 14 and 15, so that powder can flow unobstructedly through the tube into the chamber 8.

The counterbore 18 is further counterbored, as at 20, this second counterbore being threaded for the connection to the tube 16, of the threaded tubular lower end 21, of a hopper 22, which contains the powder to be melted and sprayed by the torch.

The powder is carried, by gravity, from the hopper 22 through the tubular element 21, resilient tube 19, and bore 17 and openings 14 and 15 into the chamber 8. The flow of combustible gas through the chamber 8 provides an aspirator action for withdrawing the powder from the chamber 8. Since the flow of powder through the tube 19 depends partly upon gravity and partly upon suction of the aspirator, the flow of powder is proportional to the combustible mixture flow, because the suction of the aspirator depends upon the amount of combustible mixture discharged by the nozzle 7.

For the purpose of automatically shutting off the flow of powder through the tube 19, a plunger 23 having a rounded forward end 24 is provided. The plunger 23 is slidable in an opening 25 in the rear wall of a tubular housing 26. The housing 26 is threadedly secured in an opening 27 in the rear wall of the tube 16, and is locked to said wall by a lock nut 28, which is threaded onto the housing 26.

The plunger 23 is normally urged to the position shown in FIGS. 1 and 2, by means of a compression coil spring 29, which is interposed between the rear wall of the housing 26 and an abutment collar 30, which is threaded onto the forward portion of the plunger 23. In this position, the rounded forward end 24 of the plunger 23 squeezes the tube 19 shut so that no powder can flow through this tube.

Means have also been provided for withdrawing the plunger 23, to a position, in which the tube 19 recovers its original cylindrical shape at the point or area at which it was squeezed, so that powder can again fall freely through the tube 19. For this purpose, the plunger 23 is provided at its rear end with a head 31 forward integrally with the plunger.

The tube 16 has brazed to opposite sides thereof, adjacent the lower end of this tube, a pair of plates 32 and 33, provided with aligned openings 34, for the reception of the ends of a pin 35. The pin 35 has a central portion 36 of reduced diameter.

Pivotally secured to the pin 35, between the plates 32 and 33, is a handle consisting of a horizontal portion 37 and a vertical portion or leg 38.

The pin 35 is retained against axial displacement from the openings 34 by means of a set screw 39, which, as shown in FIG. 1, extends through the leg 38 and into the space between the ends of the pin 35 formed by the reduction in diameter of the portion 36 of the pin.

The horizontal portion 37 of the handle has brazed thereto adjacent its forward end, an upstanding member 40, having furcations 41 and 42, which extends into the space between the rear wall of the housing 26 and the head 31 of the plunger 23, and straddle the plunger.

The torch is normally gripped by the butt 4, and when thus gripped, the handle 37 may be depressed by the thumb of the gripping hand from the position shown in solid lines in FIG. 1 to the position shown in broken lines. In thus depressing the handle, the furcations 41 and 42 of the member 40 slidably engage the head 31 of the plunger 23, causing the plunger to be withdrawn to a position in which the tube 19 recovers its original cylindrical shape, so that the powder can fall freely therethrough. In thus withdrawing the plunger 23, the spring 29 is compressed, so that when the handle 37 is released, the plunger again squeezes the tube 19 shut.

It is desirable, in the operation of the torch, to provide, at times, means for preventing the tube 19 from being entirely closed, that is to say, to provide means for maintaining a passage through the tube which is of lesser area than the fully-open passageway through the tube. For example, if a coating operation of long duration is being performed, and a relatively small, but continuous uniform flow of powder is desired, it is desirable to obtain such a long, continuous, uniform flow, by partially closing the passageway through the tube, while being relieved from the necessity of maintaining the handle 37 depressed throughout the coating operation. Also, in a coating operating, which continues from one day to another, it is desirable, once the passageway has been partially closed, to retain the reduced flow setting from one day to the next, without manipulation or adjustment of parts of the torch.

For this purpose, I have provided a screw 43 which is threadedly mounted in the vertical or leg portion 38 of the handle, and which extends through the handle, in the manner shown in FIGS. 1 and 3. The screw 43 is provided with a slotted head 44, so that the screw can be adjusted with an ordinary screw driver.

In the position shown in FIG. 1, the screw 43 has been withdrawn to a position, in which it is of no effect, in that it does not prevent the plunger 23 from squeezing the tube 19 fully shut or closed.

If, however, the screw 43 is turned, so as to move it to the left, as viewed in FIG. 1, the toe 45 of the screw will engage the rera wall of the tube 16, and thus prevent the spring 29 from fully closing the tube 19. The tube will then have an opening therethrough, adjacent the plunger, which is of reduced cross-section, so that a smaller volume of powder can flow continuously through the tube. This reduced volume opening will be automatically maintained throughout the coating operation, and without the necessity, at any time, of manipulating the handle 37. The screw can be adjusted, so that virtually any size opening can be effected through the tube, up to the maximum opening provided by the tube.

The screw 43 is in an easily accessible position for adjustment, and is below the horizontal portion 37 of the handle, so that it does not obstruct manipulation of the handle. Moreover, the adjustment is effected without the use of wing nuts or like elements, and the handle is retained securely on the torch body, and the plunger closing spring is fully concealed and protected, so that neither the handle nor the spring can be dislodged from position.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a touch for supplying powdered metal or the like through a flame to a work piece, a torch body having a chamber therein and from which a combustible gas mixture is discharged through a tip, an outer tube extending upwardly from the torch body and comunicating, through the torch body, with the chamber, a resilient tube within the outer tube and communicating with a source of powder which falls through the resilient tube by gravity, a tubular housing mounted on said outer tube and extending substantially at right angles to the outer tube, a plunger slidable axially in said housing and having an inner end which contacts the resilient tube, a compression coil spring within said housing for actuating said plunger to cause the inner end of the plunger to pinch the resilient tube to close the flow of powder through the resilient tube, a handle which is independent of said plunger and is disposed adjacent said torch body, said handle being pivotally movable and operatively connected to said plunger for retracting the plunger to permit said resilient tube to resume its original cylindrical form to permit passage of powder therethrough, and means for preventing said plunger from fully closing said resilient tube to the flow of powder therethrough, said means comprising a screw extending through said handle and having an end which abuts said outer tube, said screw being adjustable to control the size of the opening through said resilient tube.

2. A torch, as defined in claim 1, in which said handle has a horizontal portion and a depending vertical portion, and said screw is threadedly mounted in the vertical portion of the handle, the end of said screw being movable into abutment with said outer tube to control upward movement of said handle.

References Cited by the Examiner

UNITED STATES PATENTS

| | | | |
|---|---|---|---|
| 358,943 | 3/87 | Ritchie | 222—473 |
| 872,482 | 12/07 | Tolman | 222—473 |
| 1,880,331 | 10/32 | Rapp | 239—82 |
| 2,389,702 | 11/45 | Ullmer | 239—85 |
| 2,635,622 | 4/53 | Owens | 251—285 |
| 2,786,779 | 3/57 | Long et al. | 239—85 |
| 2,787,497 | 4/57 | Kough | 239—85 |
| 2,957,630 | 10/60 | Lamb | 239—85 |

M. HENSON WOOD, JR., *Primary Examiner.*

EVERETT W. KIRBY, *Examiner.*